United States Patent
Fu

[11] Patent Number: 5,848,661
[45] Date of Patent: Dec. 15, 1998

[54] VEHICLE SEAT ASSEMBLY INCLUDING AT LEAST ONE OCCUPANT SENSING SYSTEM AND METHOD OF MAKING SAME

[75] Inventor: David T. Fu, Rochester Hills, Mich.

[73] Assignee: Lear Corporation, Southfield, Mich.

[21] Appl. No.: 735,326

[22] Filed: Oct. 22, 1996

[51] Int. Cl.$^6$ .................................................. B60K 28/00
[52] U.S. Cl. .......................... 180/273; 280/735; 297/410
[58] Field of Search ............................. 280/735; 297/410, 297/391; 318/568.1, 567; 180/273

[56] References Cited

U.S. PATENT DOCUMENTS

| | | | |
|---|---|---|---|
| 3,420,572 | 1/1969 | Bisland | 297/410 |
| 4,082,354 | 4/1978 | Renner et al. | 297/410 |
| 4,645,233 | 2/1987 | Bruse et al. . | |
| 4,807,934 | 2/1989 | Sakakibara | 297/403 |
| 4,834,420 | 5/1989 | Sankrithi et al. . | |
| 4,935,680 | 6/1990 | Sugiyama | 318/567 |
| 5,071,160 | 12/1991 | White et al. . | |
| 5,074,583 | 12/1991 | Fujita et al. . | |
| 5,095,257 | 3/1992 | Ikeda et al. | 318/568.1 |
| 5,118,134 | 6/1992 | Mattes et al. . | |
| 5,366,241 | 11/1994 | Kithil . | |
| 5,398,185 | 3/1995 | Omura . | |
| 5,400,487 | 3/1995 | Gioutsos et al. . | |
| 5,413,378 | 5/1995 | Steffens, Jr., et al. . | |
| 5,474,327 | 12/1995 | Schousek . | |

*Primary Examiner*—Christopher P. Ellis
*Attorney, Agent, or Firm*—Brooks & Kushman P.C.

[57] ABSTRACT

A vehicle seat assembly comprising occupant sensing systems for use in headrest adjusting and/or air bag actuation systems. One sensing system includes a passive transducer array in the form of pressure transducers such as force sensing resistors vertically spaced in a first embodiment in a headrest cushion of the vehicle seat. In a second embodiment, the pressure transducers are vertically spaced in a backrest cushion of the seat. The pressure transducers generate signals which are processed by a controller to generate a control signal to control a bidirectional headrest motor coupled to the headrest of the vehicle seat. In another sensing system, occupant sensors in the form of either force sensing resistors or mechanical switches are embedded in the seat back cushion and the seat bottom cushion to generate signals which are processed by the controller to generate a control signal for use by an air bag actuation circuit to prevent air bag deployment when the controller determines that the vehicle seat is either unoccupied or is occupied by a rear-facing child car seat. The controller includes control logic to distinguish between a properly seated occupant and the rear-facing infant seat based on the electrical output signals from the occupant sensors located in the seat back and bottom cushion.

13 Claims, 6 Drawing Sheets

VEHICLE SEAT ASSEMBLY INCLUDING AT LEAST ONE OCCUPANT SENSING SYSTEM AND METHOD OF MAKING SAME

TECHNICAL FIELD

This invention relates to vehicle seat assemblies and method of making same and, in particular, to vehicle seat assemblies including at least one occupant sensing system and methods of making same.

BACKGROUND ART

Vehicle seat assemblies come in a wide variety of shapes and sizes. Many vehicle seat assemblies currently include integrated front seat belts. Such assemblies eliminate the need to anchor the shoulder belts to a pillar between the front and rear windows, instead containing the entire belt apparatus within the seat. Some advantages of such integrated seat belts is that they eliminate unsightly shoulder belts hooked to the pillars and also improves entry and exit in some vehicles. The integrated belts also make it easier to remove the second and third rows of seats in minivans. Furthermore, such integrated seat belts are generally more comfortable because the belts move with the seat.

Vehicle seat assemblies including occupant sensing systems are well known. One method for the automatic adjustment of headrest height involves active transducers (i.e. ultrasound or infrared light-emitter transmitter and receiver pairs). The transmitters emit non-visible waves and receivers at various locations sense the reflected or interrupted signal from the head of the occupant.

For example, the Bruse et al. U.S. Pat. No. 4,645,233 discloses an adjustment mechanism for automatically adjusting the height of a headrest of vehicle seat wherein a sensor detects the seating height of a person seated on the vehicle seat in a normal position and controls a motor for the height adjustment of the headrest in accordance with detection results. In one embodiment, one light emitter-receiver is located in the upper area of the front side of a headrest, while another light emitter-receiver detects the height of a shoulder of the person.

Another vehicle seat assembly including an occupant sensing system is disclosed in the Bauer U.S. Pat. No. 5,431,447. Sensors generate signals which are processed by a microcomputer and to, in turn, generate a control signal which actuates a motor in a seat belt restraint system. The sensors sense characteristics of an occupant such as weight and location of the occupant in the vehicle.

Other vehicle seat assemblies include occupant sensing systems in order to generate a control signal which can be used by an air bag actuation circuit to inhibit air bag deployment. When one or more air bags are provided in an automobile, the air bag may be stored in many different locations such as in a steering wheel, in a seat bolster, a door panel or in an instrument panel of the vehicle.

Such systems are desirable and are often times preferred over occupant sensing systems mounted in front of the vehicle occupant. Mounting an occupant position sensor in front of a vehicle occupant or to the side of the occupant may provide a false reading because of an object placed between the position sensor and the occupant. For example, the object may be the hand of the vehicle occupant, the crossed legs of the occupant, or a map or the like held between the position sensor and the occupant.

The Steffens, Jr. et al. U.S. Pat. No. 5,439,249 discloses a vehicle seat assembly including an occupant sensing system having a sensor mounted in the seat back. Preferably, the sensor is an ultrasonic sensor having a sound beam.

The Mattes et al. U.S. Pat. No. 5,118,134 discloses a vehicle seat assembly including an occupant sensing system having a position sensor in the headrest of the vehicle seat. The position sensor has at least one light transmitter and one light receiver.

The Fujita et al. U.S. Pat. No. 5,074,583 discloses a vehicle seat assembly including an occupant sensing system including a plurality of pressure sensors having a spaced relationship relative to one another to detect pressure acting on the seat back and seat cushion. The sensors typically are electrostatic capacitance sensors to detect a pressure distribution across the seat device in order to provide a control signal for an air bag system.

The Schousek U.S. Pat. No. 5,474,327 discloses a vehicle seat assembly including an air bag restraint system wherein air bag deployment is inhibited when an occupied, rear-facing infant seat is present. The sensing apparatus comprises eight variable resistance pressure sensors located in a seat cushion.

The Steffens, Jr. et al. U.S. Pat. No. 5,413,378 also discloses a vehicle seat assembly including an occupant sensing system having an occupant position sensor which takes the form of an ultrasonic sensor.

U.S. Pat. Nos. 5,071,160; 5,232,243; 5,366,241; 5,398,185; and 5,400,487 all discloses passenger seat detecting and position determining sensors for controlling passive restraint systems including air bags in vehicles.

U.S. Pat. No. 4,834,420 discloses an air bag-equipped child seat.

SUMMARY OF THE INVENTION

An object of the present invention is to provide a vehicle seat assembly including an occupant sensing system and method of making same wherein strategically placed occupant sensing sensors are incorporated in the seat to generate signals for use by a controller of the system which, in turn, generates a control signal for use by an occupant restraint system.

Another object of the present invention is to provide a vehicle seat assembly including at least one occupant sensing system and method of making same wherein occupant sensing sensors are strategically placed in the vehicle seat to generate signals for use by a controller of the system which, in turn, generates a control signal for use to control a motor coupled to a headrest of the seat assembly to adjust the height of the headrest.

Automatic headrest adjustment is to protect an occupant during a rear crash (whiplash). A properly adjusted headrest can reduce neck injury. Also, when the headrest carries a seatbelt, automatic adjustment of the headrest automatically adjusts the position of the seatbelt.

Still further in carrying out the above objects and other objects of the present invention, a method is provided for manufacturing a vehicle seat assembly including a vehicle seat having a headrest and back and bottom cushions wherein a passive transducer array is positioned in the back cushion so as to sense height of an occupant in the seat.

In carrying out the above objects and other objects of the present invention, a vehicle seat assembly constructed in accordance with the present invention is provided. The assembly includes a vehicle seat having seat back and bottom cushions to support corresponding back and bottom parts of an occupant seated on the vehicle seat and a headrest having a headrest cushion with a variable height relative to the bottom cushion. The assembly also includes an occupant-sensing system having a passive transducer array mounted in one of the seat back and headrest cushions to detect pressure caused by the occupant seated on the vehicle seat and to generate corresponding electrical output signals. Finally, the assembly includes a controller coupled to the passive transducer array for processing the electrical output signals and generating an electrical control signal adapted to automatically control a motor coupled to the headrest to adjust the variable height of the headrest cushion.

In one embodiment, the passive transducer array is mounted in the headrest cushion to detect location of a head of the occupant seated on the vehicle seat relative to the headrest. The controller generates the control signal based on a seating height of the occupant seated on the vehicle seat.

In another embodiment, the passive transducer array is mounted in the seat back cushion to detect location of an at least one acromion of the occupant seated on the vehicle seat relative to the seat back cushion. The controller generates the control signal based on a sitting acromial height of the occupant seated on the vehicle seat.

Preferably, the passive transducer array includes three vertically spaced pressure transducers. Also, preferably, the pressure transducers are force-sensing resistors.

The assembly also preferably includes a seat belt coupled to the headrest to move therewith. In this case, when the headrest is at the proper height (based on the height of a shoulder of the occupant), then the seatbelt is also at the proper height to optimize the protection of the occupant.

Further in carrying out the above objects and other objects of the present invention, a vehicle seat assembly constructed in accordance with the present invention is provided. The assembly includes a vehicle seat having seat back and bottom cushions to support corresponding back and bottom parts of an occupant seated on the vehicle seat. The assembly also includes an occupant-sensing system including at least one occupant-sensing sensor mounted in the seat back cushion to generate a first electrical output signal and a second occupant-sensing sensor mounted in the bottom cushion to generate a second electrical output signal in response to pressure caused by the occupant seated on the vehicle seat. Finally, the assembly includes a controller coupled to the sensors for processing the electrical output signals and generating an electrical control signal. The controller includes control logic to distinguish between a properly seated occupant and a rear-facing infant seat on the vehicle seat based on the electrical output signals.

Preferably, the control signal is adapted for use by an air bag activation system to prevent an air bag from being deployed in the absence of an occupant (or a rear-facing child seat) on the vehicle seat.

Also, preferably, a pair of occupant-sensing sensors are mounted in the seat back cushion to generate the first electrical output signal.

Still further in carrying out the above objects and other objects of the present invention, a method is provided for making a vehicle seat assembly. The method includes the step of providing a vehicle seat including a headrest and back and bottom cushions. The headrest has a variable height relative to the bottom cushion. The method also includes the steps of mounting a passive transducer array in the back cushion so as to sense height of an occupant in the seat, mounting a motor in the vehicle seat, and providing a controller. Finally, the method includes the steps of coupling the passive transducer array to the controller, the motor to the headrest and the controller to the motor to obtain the assembly.

Preferably, the passive transducer array includes three pressure transducers and the step of mounting includes the step of mounting the three pressure transducers in a vertically-spaced relationship in the back cushion of the headrest. In one embodiment, the back cushion is a headrest cushion. In another embodiment, the back cushion is a seat back cushion.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
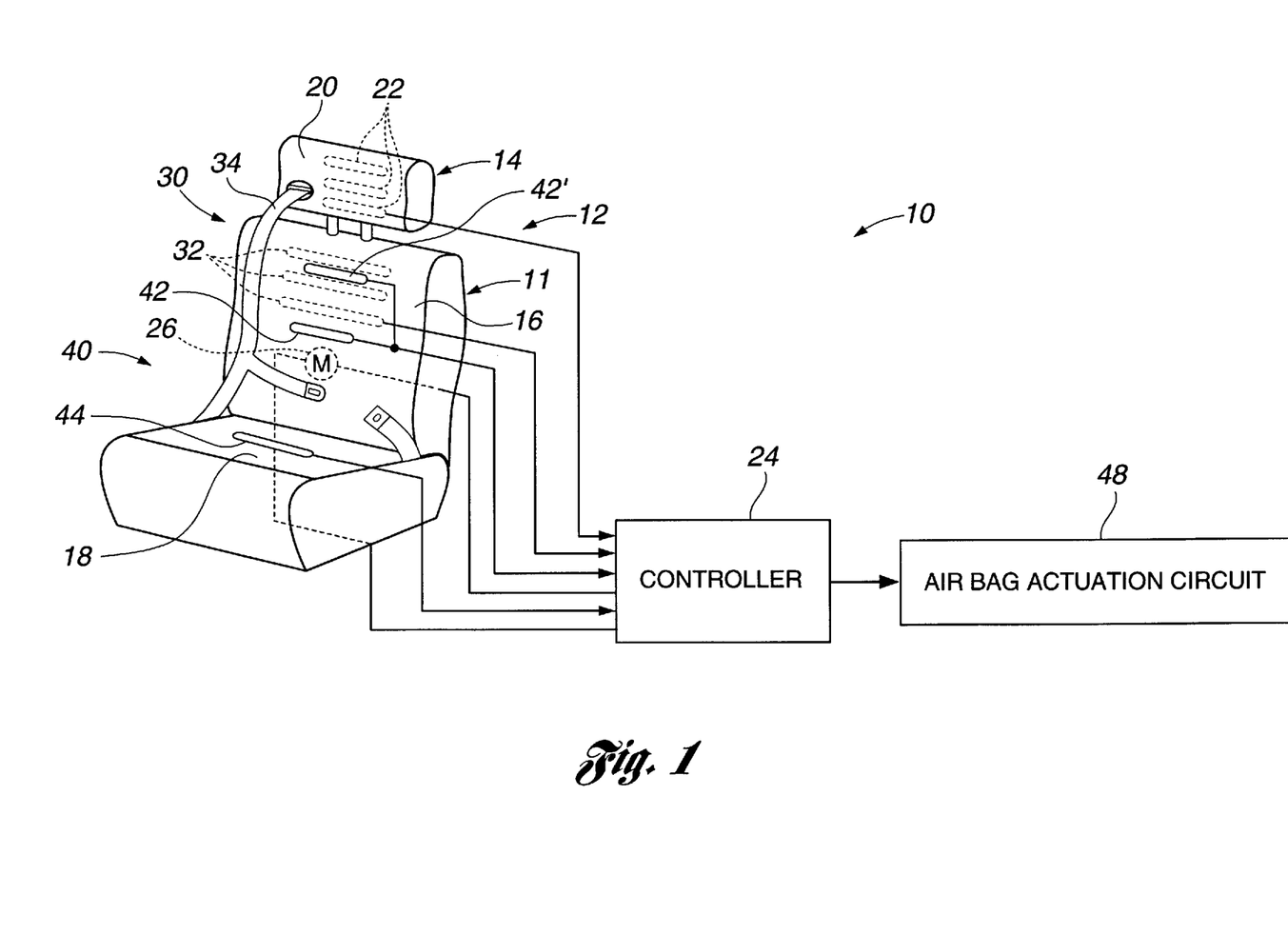
FIG. 1 is a perspective view of a vehicle passenger side seat assembly including an occupant sensing system and automatic head restraint adjustment system constructed in accordance with the present invention.

Referring now to the drawing Figures, there is illustrated in FIG. 1 a vehicle seat assembly, generally indicated at 10, including a vehicle seat, generally indicated at 11, and an occupant sensing system, generally indicated at 12. The occupant sensing system is particularly adapted to provide control signals in an automatic headrest adjustment system as described hereinbelow. In general, the occupant sensing system 12 senses the location of a head of an occupant on a headrest, generally indicated at 14, of the seat 11 in a first embodiment of the present invention or the height of the occupant shoulder while the occupant is seated in a second embodiment of the present invention. In both embodiments, a passive transducer array (i.e. pressure transducers, or force sensing resistors) is used for sensing.

The vehicle seat 11 includes seat back and bottom cushions 16 and 18, respectively, to support corresponding back and bottom parts of an occupant seated on the vehicle seat 11. The headrest 14 includes a headrest cushion 20 which has a variable height relative to the bottom cushion 18.

Figure 2:
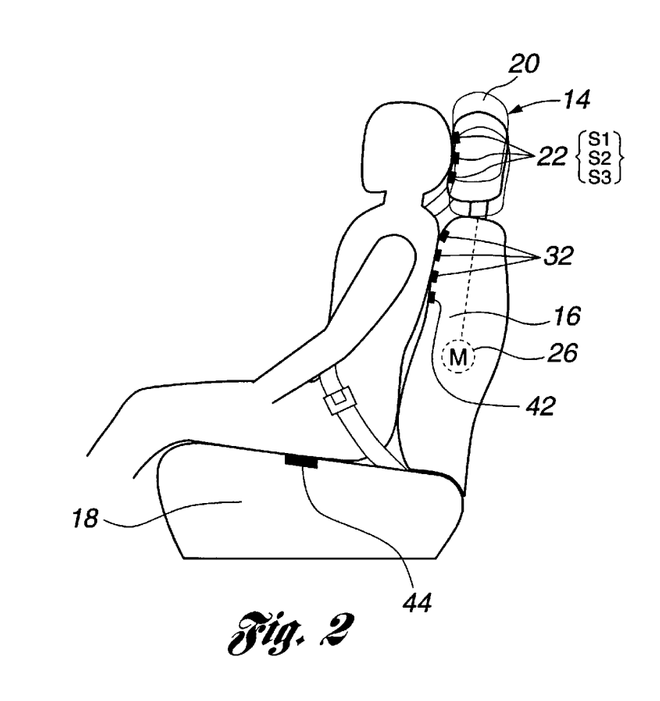
FIG. 2 is a side elevational view illustrating different positions in a vehicle seat for a passive transducer array and three different positions of a headrest of the seat.

In the first embodiment and referring to FIGS. 1 and 2, the occupant sensing system 12 for use in the automatic headrest adjusting system includes a passive transducer array in the form of pressure transducers such as force sensing resistors 22 which are vertically spaced apart from one another in the headrest cushion 20. The transducers 22 detect pressure caused by the head of the occupant pressing on the headrest and generate corresponding electrical output signals. Typically, a minimum of three vertically spaced transducers 22 are required to sense the location of the occupant's head with respect to the headrest 14.

The assembly 10 also includes a controller 24 which is coupled to the transducers 22 to receive and process the electrical output signals therefrom and for generating an electrical control signal. The controller 24 typically includes a microcontroller such as a crisp or fuzzy logic processor which takes the output signals from the transducers 22 and evaluates them with a set of predefined rules. The output control signal from the controller 24 then typically drives a bidirectional headrest adjusting motor 26 which is coupled to the headrest 14. Preferably, the headrest adjusting motor 26 is a stepper motor and is controlled from the controller 24. Also, preferably, the stepper motor is controlled by the controller 24 in an open loop fashion.

The signals from the transducers 22 are typically conditioned by a conditioning circuit (not shown) prior to being input into the controller 24. Typically, the controller 24 scales the input signals and provides a scaled output control signal for use to control the motor 26.

The basic sensing algorithm is defined in Table 1 below. S1, S2 and S3 (i.e. transducers 22) constitute a linear transducer array. S1 is the uppermost transducer, S2 is the middle transducer, and S3 is the lowermost transducer, as illustrated in FIG. 2.

If no pressure is applied on the transducer array (i.e. the head of the occupant is not contacting at the certain spots of the headrest 14), the output is defined as L. If the head of the occupant is contacting the headrest 14 at a particular spot and the contact pressure is above a pre-defined threshold, the output of the transducers 22 is defined as H.

TABLE 1

| S1 | S2 | S3 | Location of the headrest |
|----|----|----|--------------------------|
| H  | L  | L  | Headrest is too low      |
| L  | H  | L  | Headrest is appropriate  |
| L  | L  | H  | Headrest is too high     |

Still referring to FIGS. 1 and 2, a second embodiment of the vehicle seat assembly 10 includes a second passive transducer array, generally indicated at 30, substantially identical to the array in the cushion 20. The array 30, however, is mounted in the seat back cushion 16 to detect pressure caused by the occupant's back on the seat back cushion 16. The passive transducer array 30 includes pressure transducers also in the form of force sensing resistors 32 to detect a location of at least one acromion or outer upper part of the shoulder blade or scapula of an occupant seated on the vehicle seat 11. In general, sensing the sitting acromial height of an individual provides sufficient information about the approximate location of an occupant's head so that the controller 24 can controllably adjust the headrest 14 through the motor 26. In other words, information is readily available which correlates the average person's shoulder blade height with the height of the person's head.

Figure 5A:
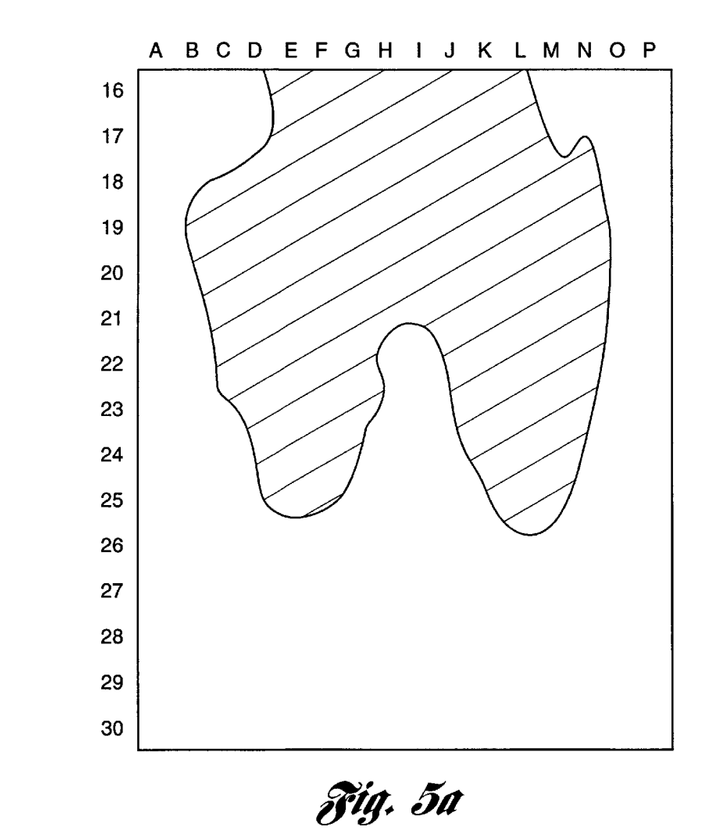
FIGS. 5a and 5b are computer-generated images illustrating the distribution of body pressure on car seat bottom and back cushions, respectively, for a first occupant.
Figure 5B:
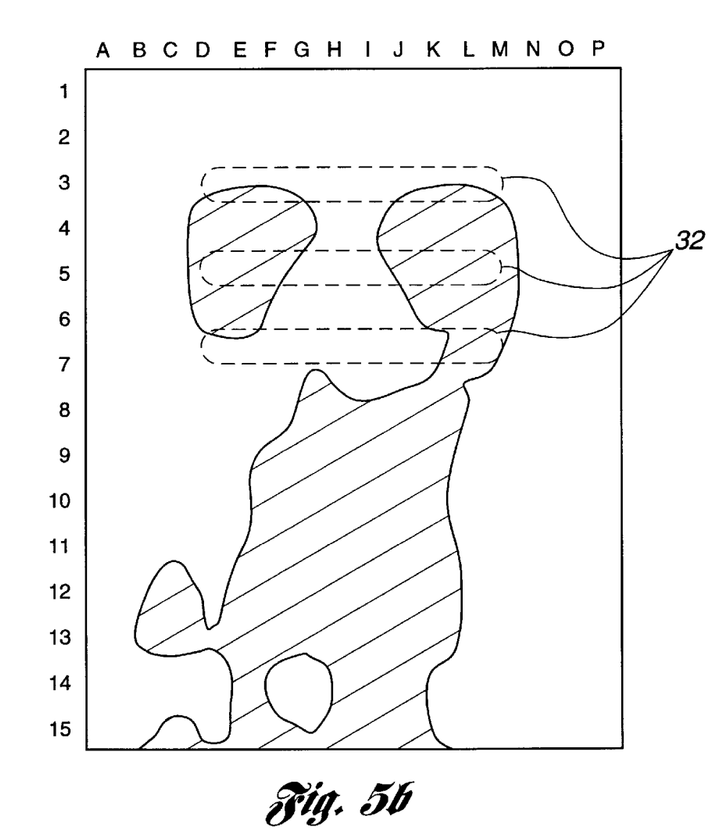
Figure 5C:
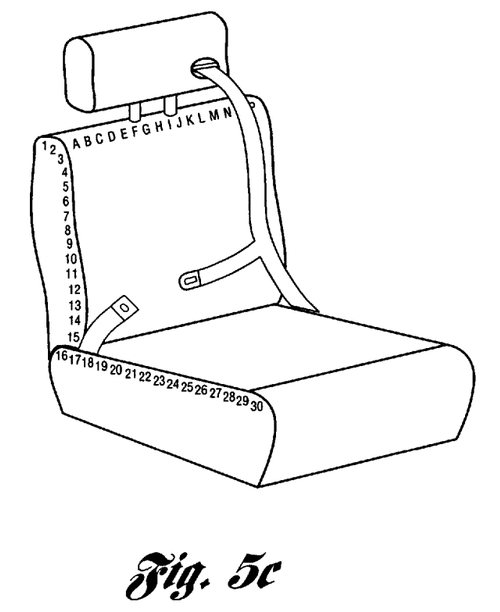
FIG. 5c is a schematic view of a vehicle seat assembly which has alphanumeric characters corresponding to the images of FIG. 5a, 5b, 6a and 6b.
Figure 6A:
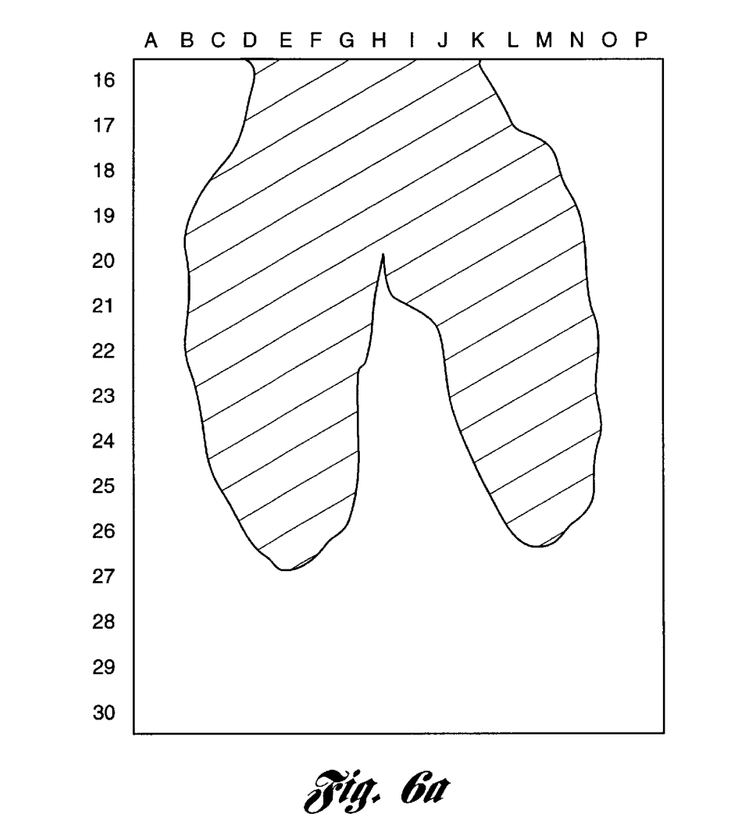
FIGS. 6a and 6b are images corresponding to the images of FIGS. 5a and 5b for a different height occupant of the vehicle seat.
Figure 6B:
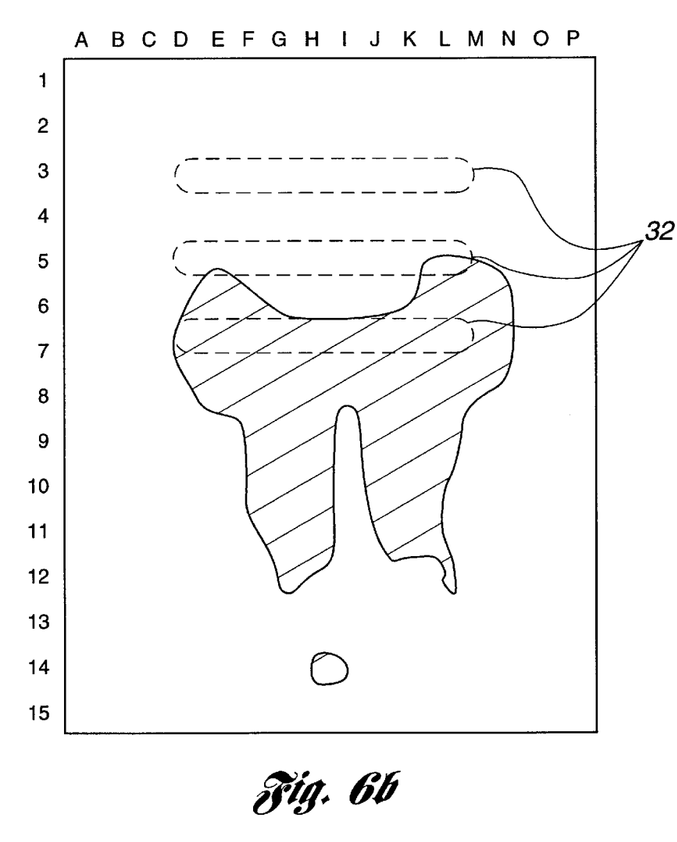

The vehicle seat 11 is preferably an integrated restraint seat in that a seat belt 34 is either incorporated in the headrest 14 or in a separate part of the vehicle seat 11 which travels with the headrest 14. In a normal driving position, the shoulder blade of the occupant generates a distinguishably higher pressure on the seat back cushion 16 at certain spots, as illustrated in FIGS. 5b and 6b. For example, FIGS. 5a and 5b illustrate computer-generated images of body pressure distributions on bottom and seat back cushions, respectively, for one individual. FIG. 5c is a schematic view of a seat assembly with alphanumeric characters thereon corresponding to the images of FIGS. 5a, 5b, 6a and 6b. FIGS. 6a and 6b illustrate computer-generated images of body pressure distributions on bottom and seat back cushions, respectively, for a second individual. The images of FIGS. 5a and 5b represent a taller occupant than the images of FIGS. 6a and 6b.

From such body pressure distributions such as illustrated in FIGS. 5a and 5b and FIGS. 6a and 6b, one can determine the location of those spots in the seat back cushion which are related to the height of the occupant. Consequently, by embedding the pressure transducers 32 into the seat back cushion 16, one can determine the relative height of the occupant and the desired height of the headrest 14 and its associated seat belt 34.

Referring now to FIGS. 1, 3, 4 and 7a, the vehicle seat assembly 10 also includes an occupant sensing system, generally indicated at 40, including a first occupant sensing sensor or transducer 42 mounted in the seat back cushion 16 to generate a first electrical output signal and a second occupant sensing sensor or transducer 44 mounted or embedded in the bottom cushion 18 to generate a second electrical output signal in response to pressure caused by the occupant seated in the vehicle seat 11. Preferably, each of the sensors 42 and 44 is either a force sensing resistor or a mechanical switching device. When the occupant sensors 42 and 44 are embodied as mechanical switches, the occupant sensor typically comprises a slide-type switch having upper and lower rails and an insulator disposed therebetween.

Figures 7A, 7B:
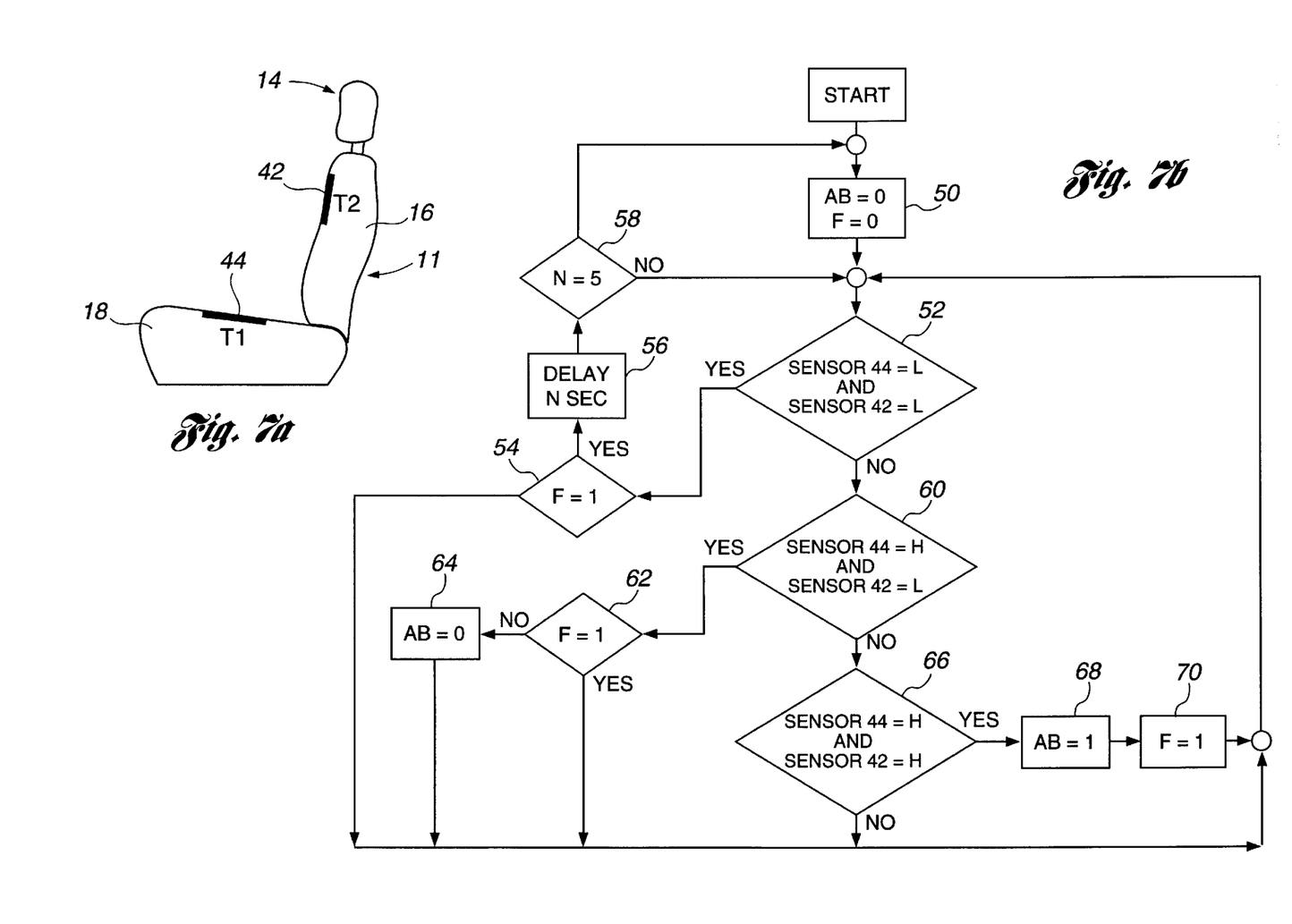
FIG. 7a is a side elevational schematic view of a vehicle seat having first and second occupant sensing sensors mounted therein.
FIG. 7b is a block diagram flow chart illustrating control logic for use in a controller to distinguish between a properly seated occupant and a rear-facing infant seat positioned on the vehicle seat.

A second sensor 42' is preferably provided together with the sensor 42 so that together the sensors 42 and 42' can sense the height of the lowest shoulder blade point of a female as well as the height of the highest shoulder blade point of a male to collectively generate an electrical output signal to thereby obtain a sitting acromial height. While the second sensor 42' is not hereinafter specifically mentioned, it is to be understood that, preferably, when the sensor 42 is mentioned, the sensor 42' is also implied.

When the sensors 42 and 44 are embodied as transducers, a minimum of two transducers T1, T2 (i.e. sensors 42 and 44 of FIG. 7a) are required to sense the presence of the occupant. One transducer 44 is placed on the bottom cushion 18 and the other transducer 42 is placed on the seat back cushion 16. The transducers 42 and 44 are embedded in the trim and no other parts are exposed to the seat surface.

The output of each of the transducers 42 and 44 is coupled to the controller 24 through a signal conditioning circuit (not shown). The controller 24 receives and processes the signals from the transducers 42 and 44 periodically. A resulting output control signal from the controller 24 is connected to air bag ignition or actuation circuit 48 which controls air bag deployment on the passenger side assuming that the seat 11 is a passenger side seat.

Referring to FIG. 2, when the seat is occupied, both transducers 42 and 44 are activated and generate a logical 1 (high) signal at the output (Table 2 below). If a rear-facing child seat is mounted on the seat 11 (i.e. FIG. 3 with respect to an instrument panel 19), only the transducer 44 (T1) at the bottom cushion 18 will activate (logic 1, high). Since there is no pressure applied on the seat back cushion 16, transducer 42 (T2) will not be activated (logic 0, low). The output from the controller 24 will become low and turn off the air bag. If neither an occupant nor a forward-facing child seat is present, the output of the logic remains low.

Consequently, this system can distinguish an occupant from rear-facing child seat. It will help to prevent an improper deploying air bag.

TABLE 2

| Scenario | T1 (Sensor 44) | T2 (Sensor 42) | Output | Air Bag |
|---|---|---|---|---|
| Nothing in the seat | 0 | 0 | 0 | OFF |
| Rear-facing child seat in the seat | 1 | 0 | 0 | OFF |
| Occupant or forward-facing child seat (i.e. FIG. 4) | 1 | 1 | 1 | ON |

Figure 3:
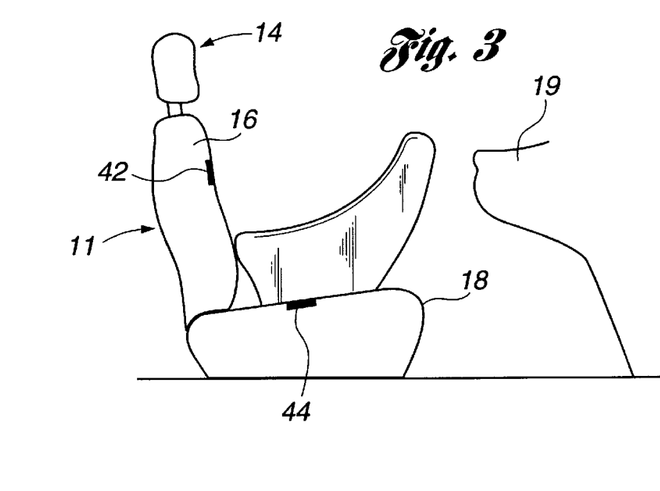
FIG. 3 is a side elevational view illustrating a rear-facing child car seat.
Figure 4:
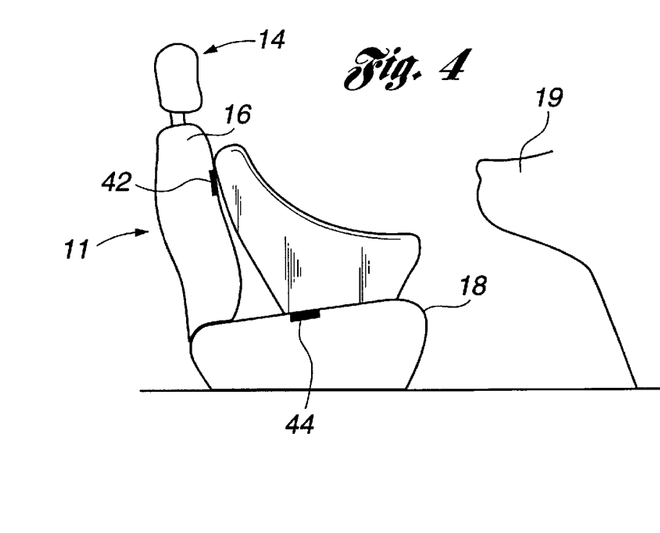
FIG. 4 is a view similar to the view of FIG. 3 wherein the child car seat is forward facing.

Referring now to FIG. 7b, there is illustrated a block diagram flow chart for the control logic contained within the controller 24 for distinguishing between a properly seated occupant and a rear-facing infant seat, and certain special conditions (i.e. occupant is leaning forward), as illustrated in FIG. 3. In general, the control logic distinguishes between a properly seated occupant and a rear-facing infant seat based on duration and frequency (i.e., patterns) of a first electrical output signal from the occupant sensor 42 (i.e. T2).

The following terminology is applicable to the flow chart of FIG. 7b:
AB=0=Air Bag Off;
AB=1=Air Bag On;
Sensor 44=L—No pressure on Cushion #1 (i.e. 18);
Sensor 44=H—Detectable pressure presence on Cushion #1;
Sensor 42=L—No pressure on Cushion #2 (i.e. 16);
Sensor 42=H—Pressure presence on Cushion #2; and
F=Air Bag on Latch Flag.

Referring again to FIG. 7b, at block 50, the air bag is off and the air bag latch flag is 0.

At block 52, it is tested to determine whether there is any pressure on either of transducers 44 or 42.

At block 54, if there is no pressure on either of cushions 1 or 2 and the air bag latch flag is set, then a predetermined delay is entered at block 56 (i.e. there was an occupant previously seated on the cushions).

At block 58, if the delay reaches a predetermined amount of time such as 5 seconds, then the logic reverts back to the beginning before block 50. However, if a delay has not timed out at block 58, then block 52 is re-entered and the signals from the first and second cushions 18 and 16, respectively, are again tested. Blocks 52, 54 and 58 take into account a special condition. For example, a car can hit a bump so that the occupant involuntarily leaves the seat or the occupant can voluntarily leave his/her seating position on the seat.

At block 60, after it has been determined that one of the transducers in one of the cushions 16 or 18 is sensing a predetermined pressure, then it is tested if the first cushion 18 has a high pressure and the second cushion 16 has a low pressure.

At block 62, if the determination at block 60 is positive, then the air bag latch flag is tested to see whether it is "on." If it is "on," (i.e. there was an occupant) then the algorithm proceeds again to block 52. If the air bag latch flag at block 62 is not "on," then the air bag control signal should be emitted to turn the air bag actuation circuit 48 "off" at block 64.

If the decision at block 60 is negative, then at block 66 it is determined whether both sensors in the top and lower cushions are experiencing pressure. If not, then logic at block 52 is again entered.

If the transducers are both experiencing pressure as tested at block 66, then at block 68, the air bag actuation circuit 48 should be turned "on," and, at block 70, the air bag latch flag should be set high. After block 70, then logic at block 52 is again reentered.

The occupant sensing algorithm illustrated by the flow chart of FIG. 7b takes into account each of the following scenarios:

1. Power on → No occupant
   T1 = L, T2 = L  AB = φ
2. Power on → No occupant → Occupant presence (seat not normal)
   T1 = L, T2 = L  T1 = H, T2 = L   AB = φ
3. Power on → No occupant → Occupant presence (seat normal)
   T1 = L, T2 = L  T1 = H, T2 = H   AB = 1
4. Power on → No occupant → Occupant (seat normal) → Occupant (seat not normal)
   T1 = L, T2 = L  T1 = H, T2 = H           T1 = H, T2 = L   AB = 1
5. Occupant presence (seat normal) → Power on
   T1 = H, T2 = H   AB = 1
6. Power on → Occupant (seat normal) → No occupant → Rear-facing child seat
   T1 = H, T2 = H         T1 = L, T2 = L    T1 = H, T2 = L
                          F = 1 → AB = φ   F ≠ 1    AB = 0
7. Rear-facing child seat → Power on
   T1 = L, T2 = L           AB = 0
8. Front-facing child seat → Power on
   T1 = H, T2 = H           AB = 1
9. Power on → Occupant(None) → Occupant Moved → Occupant
              AB = 1           T1 = L           AB = 1
                               T2 = L While the best mode for carrying out the invention has been described in detail, those familiar with the art to which this invention relates will recognize various alternative designs and embodiments for practicing the invention as defined by the following claims.

What is claimed is:

1. A vehicle seat assembly comprising:
   a vehicle seat including seat back and bottom cushions to support corresponding back and bottom parts of an occupant seated on the vehicle seat and a headrest having a headrest cushion with a variable height relative to the bottom cushion;

an occupant-sensing system including a passive transducer array including a plurality of vertically-spaced transducers mounted in one of the seat back and headrest cushions to detect pressure caused by the occupant seated on the vehicle seat and to generate corresponding electrical output signals; and a controller coupled to the passive transducer array for processing the electrical output signals and generating an electrical control signal adapted to automatically control a motor coupled to the headrest to adjust the variable height of the headrest cushion based on distribution of body pressure caused by the occupant seated on the vehicle seat detected by the vertically-spaced transducers.

2. The assembly as claimed in claim 1 wherein the passive transducer array is mounted in the headrest cushion to detect location of a head of the occupant seated on the vehicle seat relative to the headrest and wherein the controller generates the control signal based on a seating height of the occupant seated on the vehicle seat.

3. The assembly as claimed in claim 1 wherein the passive transducer array includes three vertically spaced pressure transducers.

4. The assembly as claimed in claim 3 wherein the pressure transducers are force-sensing resistors.

5. The assembly as claimed in claim 2 further comprising a seat belt coupled to the headrest to move therewith.

6. The assembly as claimed in claim 1 wherein the passive transducer array is mounted in the seat back cushion to detect location of an at least one acromion of the occupant seated on the vehicle seat relative to the seat back cushion and wherein the controller generates the control signal based on a sitting acromial height of the occupant seated on the vehicle seat.

7. The assembly as claimed in claim 6 wherein the passive transducer array includes three vertically spaced pressure transducers.

8. The assembly as claimed in claim 7 wherein the pressure transducers are force-sensing resistors.

9. The assembly as claimed in claim 6 further comprising a seat belt coupled to the headrest to move therewith.

10. A method of making a vehicle seat assembly, the method comprising the steps of:

providing a vehicle seat including a headrest and back and bottom cushions, the headrest having a variable height relative to the bottom cushion;

mounting a passive transducer array including a plurality of pressure transducers in a vertically-spaced relationship in the back cushion so as to sense height of an occupant in the seat based on distribution of body pressure caused by the occupant in the seat detected by the pressure transducers;

mounting a motor in the vehicle seat;

providing a controller; and coupling the passive transducer array to the controller, the motor to the headrest and the controller to the motor to obtain the assembly.

11. The method of claim 10 wherein the passive transducer array includes three pressure transducers and wherein the step of mounting includes the step of mounting the three pressure transducers in the vertically-spaced relationship in the back cushion.

12. The method of claim 11 wherein the back cushion is a headrest cushion.

13. The method of claim 11 wherein the back cushion is a seat back cushion.

\* \* \* \* \*